United States Patent
Ahn et al.

(10) Patent No.: US 8,472,802 B2
(45) Date of Patent: Jun. 25, 2013

(54) TWO-PHASE OPTICAL COMMUNICATION METHODS AND OPTICAL BUS SYSTEMS FOR IMPLEMENTING THE SAME

(75) Inventors: Jung Ho Ahn, Palo Alto, CA (US); Moray McLaren, Bristol (GB); Alan L. Davis, Coalville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 303 days.

(21) Appl. No.: 12/921,763

(22) PCT Filed: Mar. 10, 2008

(86) PCT No.: PCT/US2008/003147
§ 371 (c)(1),
(2), (4) Date: Sep. 9, 2010

(87) PCT Pub. No.: WO2009/113975
PCT Pub. Date: Sep. 17, 2009

(65) Prior Publication Data
US 2011/0020009 A1    Jan. 27, 2011

(51) Int. Cl.
*H04J 14/02* (2006.01)
(52) U.S. Cl.
USPC .................................... 398/69; 398/213
(58) Field of Classification Search
USPC .......................................... 398/69, 212–213
See application file for complete search history.

(56) References Cited

U.S. PATENT DOCUMENTS

| | | | |
|---|---|---|---|
| 5,465,379 A | 11/1995 | Li et al. | |
| 6,101,014 A * | 8/2000 | Majima | 398/69 |
| 6,374,020 B1 | 4/2002 | Paniccia | |
| 6,634,812 B2 | 10/2003 | Ozeki et al. | |
| 2005/0147116 A1 | 7/2005 | Morrow et al. | |
| 2005/0220396 A1 | 10/2005 | Kee et al. | |

FOREIGN PATENT DOCUMENTS

| | | |
|---|---|---|
| JP | 2000-111863 | 4/2000 |
| JP | 2005-502127 | 1/2005 |
| JP | 2006-236388 | 9/2006 |
| JP | 2007-013892 | 1/2007 |
| JP | 2007-219852 | 8/2007 |
| WO | 2004107798 | 9/2004 |

OTHER PUBLICATIONS

WO ISR dated Oct. 8, 2008.

* cited by examiner

*Primary Examiner* — Leslie Pascal

(57) ABSTRACT

Various embodiments of the present invention are directed to methods and systems for transmitting optical signals from a source to a plurality of receiving devices. In one method embodiment, an optical enablement signal is transmitted (401) from the source to the plurality of receiving devices. The target receiving device responds to receiving the optical enablement signal by preparing to receive one or more optical data signals. The source transmits the one or more optical data signals to the target receiving device. The remaining receiving devices do not receive the one or more optical data signals.

14 Claims, 16 Drawing Sheets

TWO-PHASE OPTICAL COMMUNICATION METHODS AND OPTICAL BUS SYSTEMS FOR IMPLEMENTING THE SAME

TECHNICAL FIELD

Embodiments of the present invention are related to optoelectronics, and in particular, to optical communication methods and optical bus systems.

BACKGROUND

In a processor memory system, a single memory controller typically controls the transmission of data to and from multiple memory modules. In a write transaction, control and address information specifying which location within a memory module will be written to are sent to the memory module followed or accompanied by the actual data to be written. On the other hand, a read transaction can be divided into two sub-transactions. In the first sub-transaction, control and address information are sent from the memory controller to the memory modules. In the second sub-transaction, the read-data is subsequently returned to the memory controller from the addressed memory module. The term "transaction" refers to one device requesting another device to perform a certain operation. The control, address, and data are encoded in electrical signals that are transmitted over wires. However, a common problem associated with the above described transactions and in nearly all long wire communications across a circuit board is maintaining the integrity of the electrical signals. The distortion imposed by typical wire-based transport media on an electrical signal can sufficiently reduce the integrity of the electrical signal resulting in the electrical signal being misinterpreted at the destination devices.

As the feature size of integrated circuit processes shrink, the electrical signal integrity problem worsens. In addition, electrical signal integrity issues seriously impede efforts to achieve high data transfer rates and memory capacity. Electrical signal integrity degrades both with increased signaling speed and with an increased number of receivers, such as increased signal fan-out. In order to increase memory capacity, for example, one can either increase the storage capacity of the individual memory modules or increase the number of memory modules attached to each memory controller. Increasing the number of memory modules increases fan-out which compromises electrical signal integrity. Increasing the storage capacity of an individual memory module can be accomplished by increasing the number of ranks, banks, or the size of the individual memory arrays. All of these options, however, introduce a new host of problems such as increased power consumption, increased management overhead, and increased access latency. An optical bus may be an attractive alternative to electrical busses because optical signals suffer from significantly less loss and distortion over longer distances than do electrical signals.

FIG. 1 shows a schematic representation of a typical optical bus system 100 for transmitting information from a memory controller 101 to one of four memory modules 102-105 using optical signals 106-110. The optical signals 106-110 can be transmitted in free space or waveguides, such as optical fibers. In particular, the memory controller 101 produces an optical clock signal 106 and optical address, control, and data signals 107-110. Partially reflective minors divert portions of optical signals 106-110 to corresponding optoelectronic converters which are electronically coupled to the memory modules 102-105. For example, five optoelectronic converters 111-115 are electronically coupled to the memory module 103, and partially reflective mirrors 121-125 divert a portion of each of the optical signals 106-108 to the corresponding optoelectronic converters 111-115. Each of the optoelectronic converters converts the diverted optical signal into an electrical signal encoding the same information as the optical signal. As shown in FIG. 1, even though only one of the memory modules is the target of the transaction, the transaction comprises broadcasting the same optical signals 106-110 to all of the memory modules 102-105. Although optical power increases only slightly with the length of the optical waveguides, the optical power needed to broadcast an optical signal to all of the memory modules is directly proportional to the number of memory modules. In other words, the memory controller 101 must produce enough optical power so that optical signal can be received by all of the memory modules 102-105. Broadcasting control, address, and data to all of the memory modules 102-105 per transaction where only one of the memory modules is the target of the transaction is an inefficient use of optical transport media.

Engineers and computer scientists have recognized a need for methods and systems that can reduce the amount of optical power needed to transmit data encoded in optical signals between transmitting and receiving devices.

SUMMARY

Various embodiments of the present invention are directed to methods and systems for transmitting optical signals from a source to a plurality of receiving devices. In one method embodiment, an optical enablement signal is transmitted from the source to the plurality of receiving devices. The target receiving device responds to receiving the optical enablement signal by preparing to receive one or more optical data signals. The source transmits the one or more optical data signals to the target receiving device with only enough optical power to be received by the target receiving device. The remaining receiving devices do not receive the one or more optical data signals.

DETAILED DESCRIPTION

Figure 1:
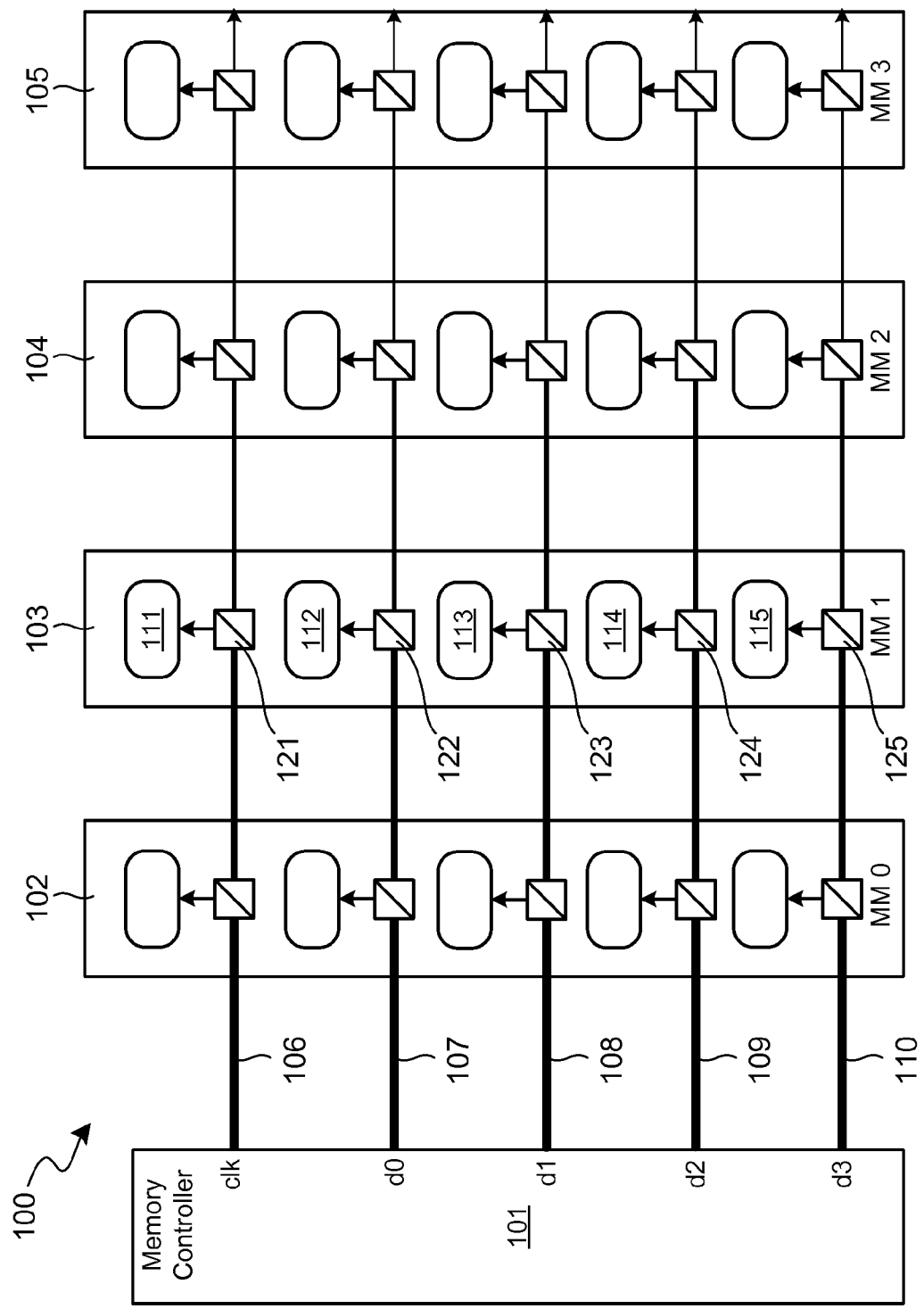
FIG. 1 shows a schematic representation of an optical bus system for broadcasting optical signals from a memory controller to four memory modules.

Various embodiments of the present invention are directed to methods and systems for transmitting optical signals from a source to a plurality of receiving devices. Although system and method embodiments are described below with reference to a source, four receiving devices, and five or six waveguides, embodiments of the present invention are not so limited. In other embodiments, any number of receiving devices and waveguides can be used. In the system embodiments described below, the source and receiving devices can represent many different kinds of computational, network, and data storage devices. For example, the receiving devices can represent dual in-line memory modules ("DIMMs"), and the source can represent a memory controller that manages the flow of data transmitted to and from the DIMMs. In still other system embodiments, the source can represent an external storage device, and the receiving devices can represent four blade servers mounted in an enclosure or chassis or they can represent four chassis each of which includes a number of blade servers. On the other hand, the method embodiments of the present invention can be applied to any situation where an optical interface is used for single-sender source and multiple-receiving device transactions. In addition, the method embodiments consume less power than conventional methods by reducing the number of active receiving devices used at any point in time. This can be achieved by dividing a transaction into two phases. In the first phase, at least one of the receiving devices receives a small amount of control information that specifies which receiving device is the target of a transaction. In the second phase, only the target receiving device actually receives the data. In certain method embodiments, the optical power needed is dependent on the number of receiving devices for only the first phase of a transaction. In the second phase, significantly more bits of data may be transmitted than in the first phase, and since only the target receiving device actually receives the data in the second phase, the total transaction power can be significantly reduced over conventional broadcast methods and systems.

In the following description, the terms "optical" and "optically" refer to devices that operate with classical and/or quantized electromagnetic radiation ("EMR") having wavelengths that are not limited to just the visible portion of the electromagnetic spectrum. In addition, a number of structurally similar components comprising the same materials have been provided with the same reference numerals and, in the interest of brevity, an explanation of their structure and function is not repeated.

Figure 2:
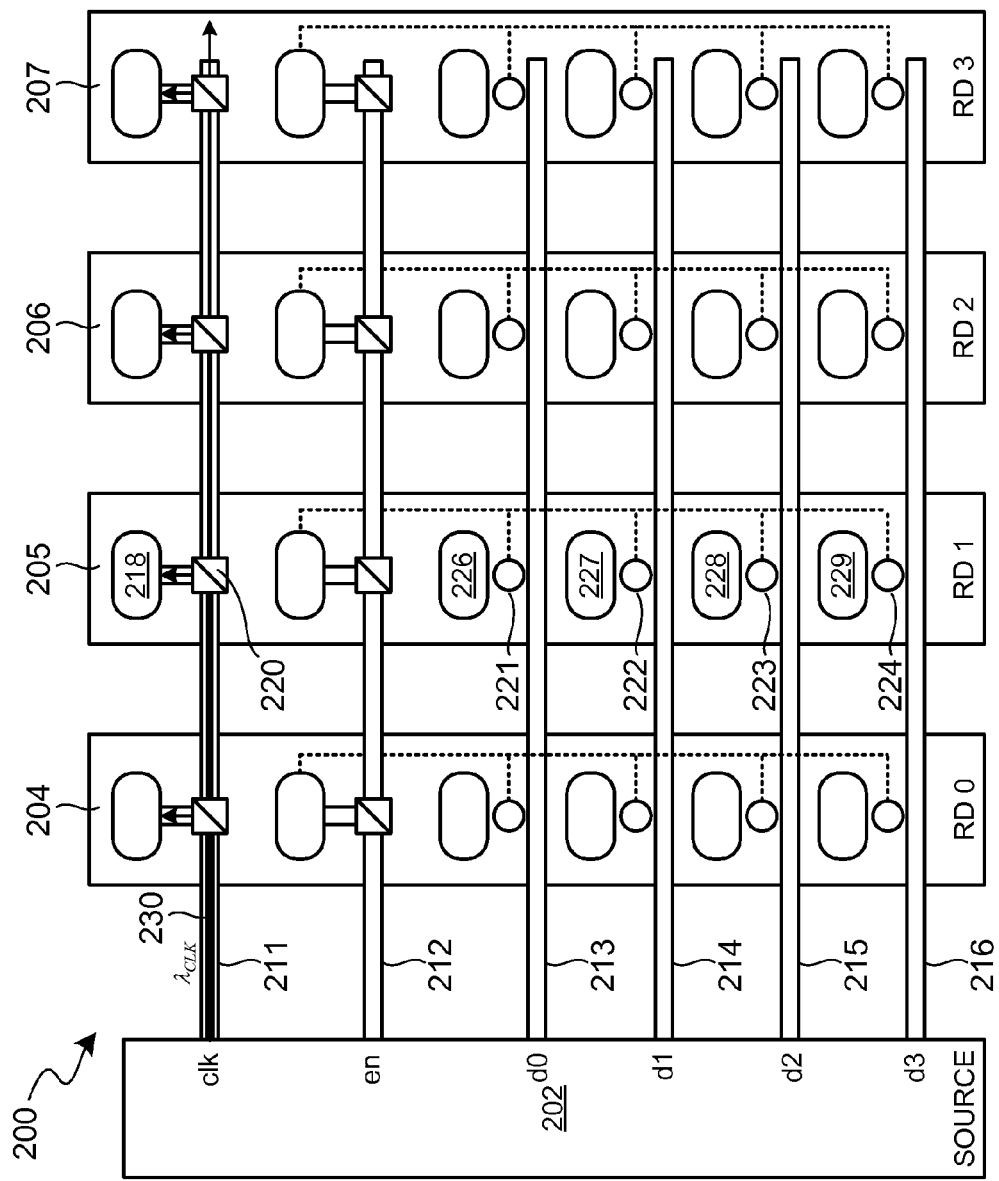
FIG. 2 shows a schematic representation of a first optical bus system configured in accordance with embodiments of the present invention.

FIG. 2 shows a schematic representation of a first optical bus system 200 configured to transmit optical signals from a source 202 to four receiving devices 204-207 in accordance with embodiments of the present invention. The optical bus system 200 includes six separate waveguides 211-216, each of which is optically coupled at one end to the source 202. The source 202 outputs an optical signal on each of the waveguides 211-216. An optical signal of a particular wavelength λ, is called a "channel." The waveguides 211-216 can be optical fibers, ridge waveguides, or photonic crystal waveguides, which are described in greater detail below with reference to FIGS. 11-15. The optical bus system 200 includes 24 optoelectronic converters, such as optoelectronic converter 218. The 24 optoelectronic converters are positioned and configured so that each optoelectronic converter is in optical communication with one of the six waveguides 211-216 and in electronic communication with one of the four receiving devices 204-207. For example, the optoelectronic converter 218 is in optical communication with the waveguide 211 and in electronic communication with the receiving device 205. The optoelectronic converters can be photodetectors, such as p-n junction or p-i-n junction photodiodes, or any other suitable optical-signal-to-electrical-signal converter. The optical bus system 200 includes partially reflective minors that divert portions of optical signals transmitted along the waveguides 211 and 212 into corresponding optoelectronic converters. For example, the partially reflective mirror 220 is optically coupled to the waveguide 211 and is configured and positioned to divert at least a portion of an optical signal transmitted along the waveguide 211 to the optoelectronic converter 218.

The optical bus system 200 also includes resonators that can be electronically controlled by corresponding receiving devices to selectively couple optical signals from the waveguides 213-216 into corresponding optoelectronic converters. The resonators can be configured to have resonance with a particular channel when an appropriate voltage is applied. As a result, a significant portion of the optical signals transmitted along the waveguides 213-216 can be evanescently coupled from the waveguides 213-216 into the resonators and into corresponding optoelectronic converters. For example, resonators 221-224 are optically coupled to the waveguides 213-216, respectively. The resonators 221-224 can each be configured so that when an appropriate voltage is applied to the resonators 221-224 by the receiving device 205, the resonance of each of the resonators 221-224 is shifted into resonance with the particular channels of the optical signals transmitted along the optically coupled waveguides 213-216, respectively. In this case, the resonators 221-224 are said to be turned "on." Thus, the optical signals transmitted along the waveguides 213-216 are evanescently coupled into the resonators 221-224 and subsequently evanescently coupled into optoelectronic converters 226-229, respectively. On the other hand, the resonators 221-224 can be configured not to have resonance with the channels of the optical signals transmitted along the waveguides 213-216 when no voltage is applied to the resonators 221-224. In this case, the resonators 221-224 are said to be turned "off." Thus, the optical signals are transmitted undisturbed along the waveguides 213-216 and past the resonators 221-224. The resonators can be any suitable device that can selectively switch light between two possible output waveguide paths of the optical bus system 200 such as microring resonators or photonic crystal resonant cavities described below with reference to FIGS. 12-15.

The source 202 can modulate an unmodulated optical signal to produce an optical clock signal $\lambda_{CLK}$ 230 that is broadcast to the receiving devices 204-207 on the waveguide 211. The optical clock signal $\lambda_{CLK}$ 230 can be amplitude, frequency, or phase modulated. As shown in FIG. 2, each partially reflective mirror diverts a portion of the optical clock signal $\lambda_{CLK}$ 230 toward a corresponding optoelectronic converter. The strength of the optical clock signal $\lambda_{CLK}$ 230 diminishes as it passes each partially reflecting mirror as represented in FIG. 2 by a line that narrows after each partially reflective mirror. The portion of the optical clock signal $\lambda_{CLK}$ 230 received by each optoelectronic converter is converted into an electrical clock signal that is transmitted to an electronically coupled receiving device. The electrical clock signal is employed by the receiving devices 204-207 to synchronize their operation with the source 202 and other electronic devices not shown.

A first method for completing a transaction between a source and a target receiving device can be accomplished in two phases which are now described with reference to FIGS. 3-4 using the optical bus system 200. Before any transaction takes place, each receiving device is assigned a different address. The source 202 selects, or can be directed to select by a different device not shown, which of the receiving devices 204-207 is the target receiving device. It is assumed for purposes of the following description that the receiving device 205 has initially been selected as the target receiving device.

Figure 3A:
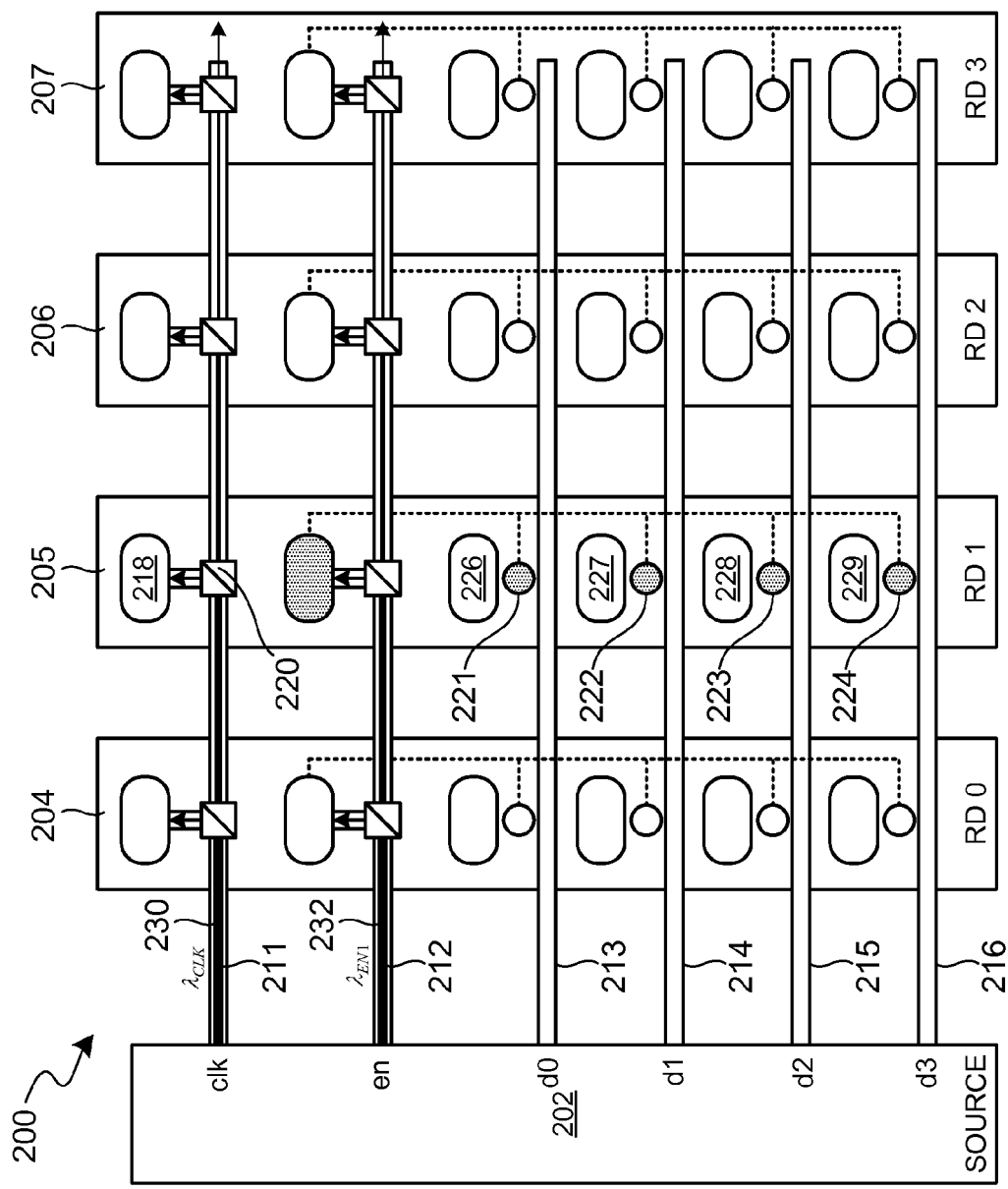
FIG. 3A shows an optical enablement signal transmitted on a waveguide of the first optical bus system shown in FIG. 2 in accordance with embodiments of the present invention.

In the first phase shown in FIG. 3A, the source 202 broadcasts an optical enablement signal $\lambda_{EN1}$ 232 to all of the receiving devices 204-207 on the waveguide 212. The source 202 encodes information in the optical enablement signal $\lambda_{EN1}$ 232 directing the receiving device 205 to receive data. Each partially reflective mirror coupled to the waveguide 212 diminishes the strength of the optical enablement signal $\lambda_{EN1}$ 232 by diverting a portion of the optical enablement signal $\lambda_{EN1}$ 232 to a corresponding optoelectronic converter. Each optoelectronic converter converts the optical enablement signal $\lambda_{EN1}$ 232 into an electrical enablement signal that is transmitted to an electronically coupled receiving device. Because the optical enablement signal $\lambda_{EN1}$ 232 encodes information specific to the receiving device 205, only the receiving device 205 responds by turning "on" its associated resonators 221-224. The remaining receiving devices 204, 206, and 207 leave their associated resonators turned "off." In this first phase, the optical power of the optical enablement signal $\lambda_{EN1}$ 232 needs to be large enough so that a portion of the optical enablement signal $\lambda_{EN1}$ 232 can be diverted by each of the partially reflective mirrors and detected by each of the corresponding optoelectronic converters.

Figure 3B:
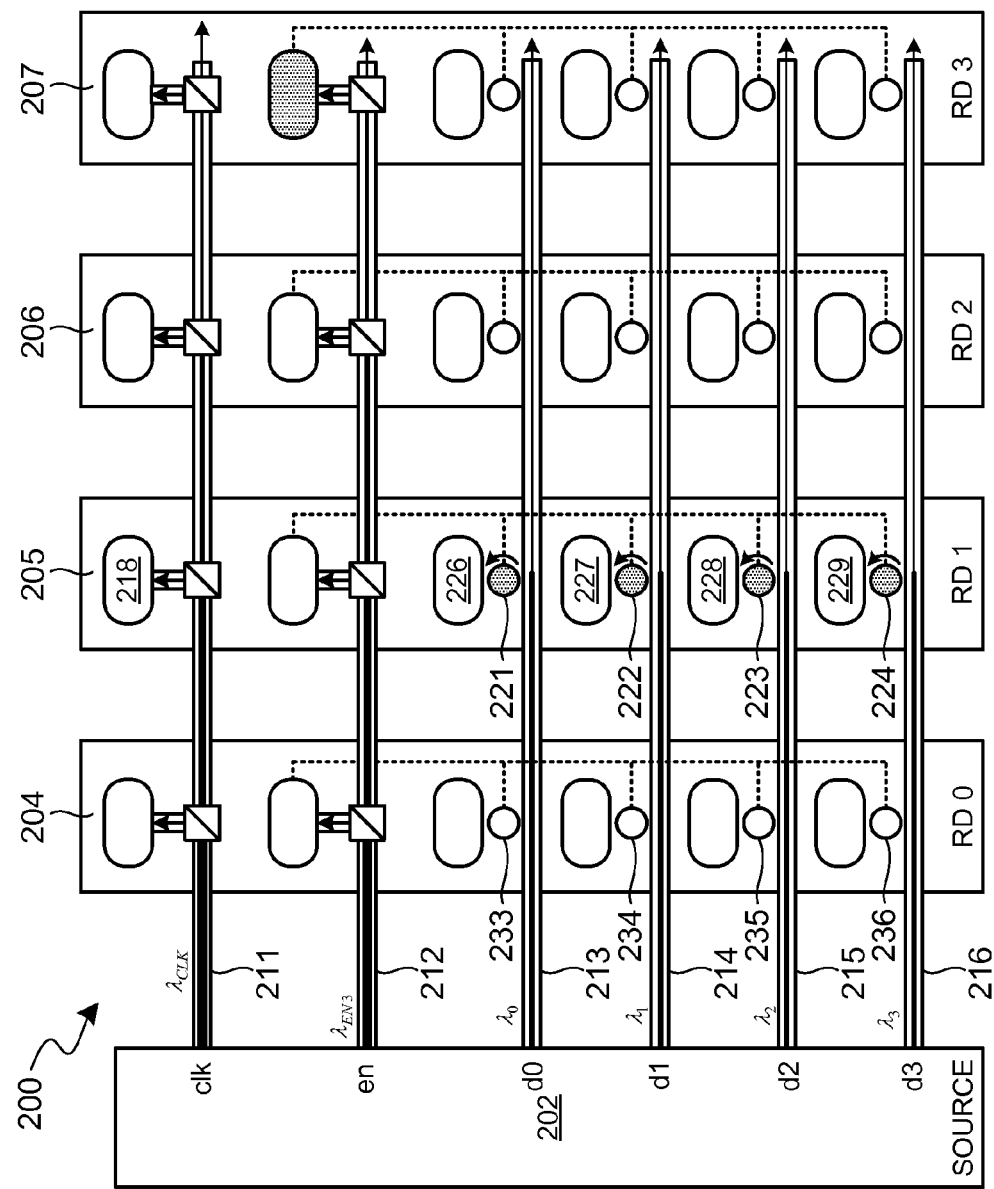
FIG. 3B shows optical data signals transmitted on four waveguides of the first optical bus system shown in FIG. 2 in accordance with embodiments of the present invention.

In the second phase shown in FIG. 3B, the source 202 discontinues transmitting the optical enablement signal $\lambda_{EN1}$ and places four optical data signals $\lambda_0$, $\lambda_1$, $\lambda_2$, and $\lambda_3$ on the waveguides 213-216, respectively. Because the resonators 221-224 are the only resonators turned "on," the optical data signals $\lambda_0$, $\lambda_1$, $\lambda_2$, and $\lambda_3$ pass the resonators 233-236 along the waveguides 213-216 undisturbed, while significant portions of the optical data signals $\lambda_0$, $\lambda_1$, $\lambda_2$, and $\lambda_3$ are evanescently coupled from the waveguides 213-216 to the optoelectronic converters 226-229 via the resonators 221-224, respectively. Because the optical data signals $\lambda_0$, $\lambda_1$, $\lambda_2$, and $\lambda_3$ are not broadcast to the remaining receiving devices 204, 206 and 207, the optical data signals $\lambda_0$, $\lambda_1$, $\lambda_2$, and $\lambda_3$ are produced with only enough optical power to be received by the receiving device 205.

In other embodiments of the first method, because the optical enablement signals are transmitted on a separate waveguide 212, the source 202 can simultaneously transmit optical data signals to a receiving device on the waveguides 213-216 and transmit an optical enablement signal on the waveguide 212 to a different receiving device to prepare the different receiving device for the next round of optical data signals. For example, as shown in FIG. 4, the optical enablement signal $\lambda_{EN3}$ is sent to activate the resonators of the receiving device 207 while the optical data signals $\lambda_0$, $\lambda_1$, $\lambda_2$, and $\lambda_3$ are being evanescently coupled from the waveguides 213-216 into the corresponding optoelectronic converters by the resonators 221-224.

Figure 4:
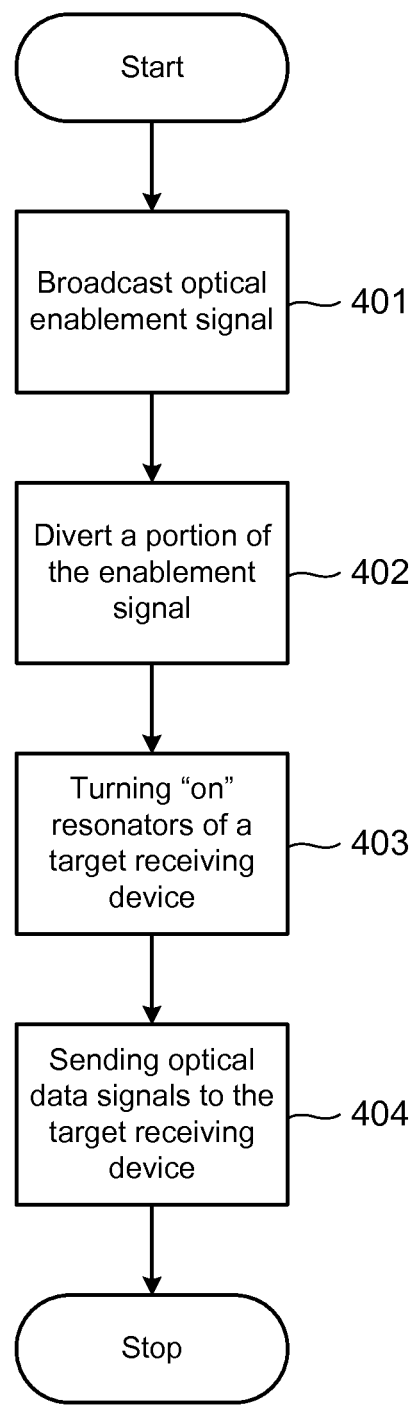
FIG. 4 is a control-flow diagram representing a number of steps of a first two-phase method in accordance with embodiments of the present invention.

FIG. 4 is a control-flow diagram representing a number of steps of the two-phase method described above with reference to FIG. 3 in accordance with embodiments of the present invention. In step 401, a source encodes information in an optical enablement signal directing a target receiving device to receive data and broadcasts the optical enablement signal to all of the receiving devices over a waveguide. In step 402, all of the receiving devices divert a portion of the optical enablement signal. In step 403, because the optical enablement signal includes information directing only the target receiving device to receive data, only the target receiving device responds by turning "on" resonators for receiving the data from the source while the remaining receiving devices respond by turning "off" their resonators. In step 404, the source transmits the data in optical signals over a number of waveguides with only enough optical power to be extracted by the target receiving device.

Figure 5:
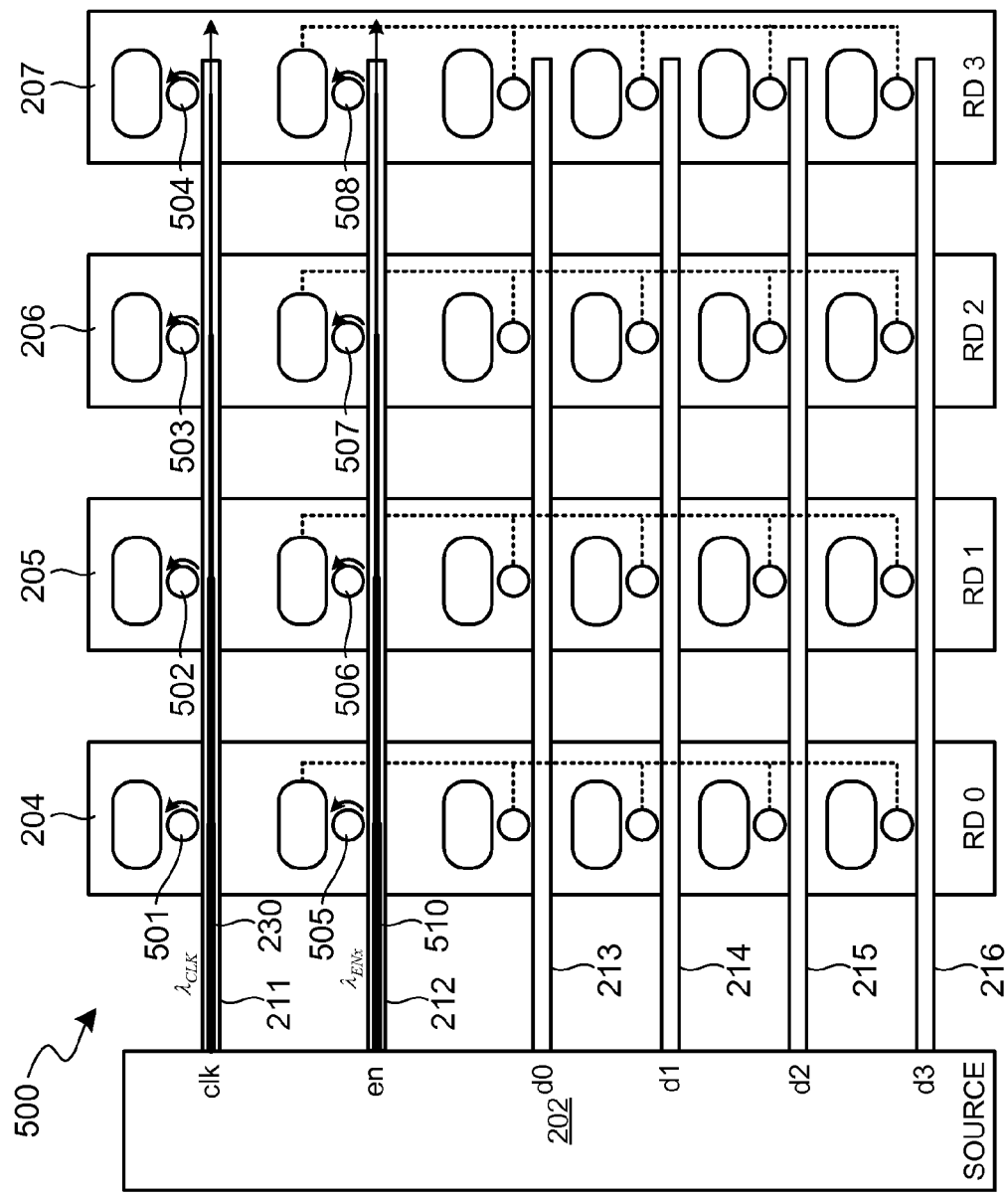
FIG. 5 shows a schematic representation of a second optical bus system configured in accordance with embodiments of the present invention.

In other embodiments of the present invention, the partially reflective mirrors that divert optical clock and address signals from the waveguides 211 and 212 can be replaced with resonators. FIG. 5 shows a schematic representation of a second optical bus system 500 configured to transmit optical signals from the source 202 to the receiving devices 204-207 in accordance with embodiments of the present invention. The optical bus system 500 is nearly identical to the optical bus system 200 except the partially reflective mirrors that are optically coupled to the waveguides 211 and 212 of the optical bus system 200 have been replaced by resonators that are configured to evanescently couple a portion of the optical signals transmitted along the waveguides 211 and 212 into corresponding optoelectronic converters. For example, the resonators 501-504 are configured to have resonance with the channel of the optical clock signal $\lambda_{CLK}$ 230 and evanescently couple the optical clock signal $\lambda_{CLK}$ 230 from the waveguide 211, and the resonators 505-508 are configured to have resonance with the channel of the optical enablement signal $\lambda_{ENx}$ 510 and evanescently couple the optical enablement signal $\lambda_{ENx}$ 510 from the waveguide 212, where x is 0, 1, 2, or 3. Unlike the electronically operable resonators used to evanescently couple with optical signals transmitted in the waveguides 213-216, the resonators 501-508 do not have to be electronically operable.

Figure 6:
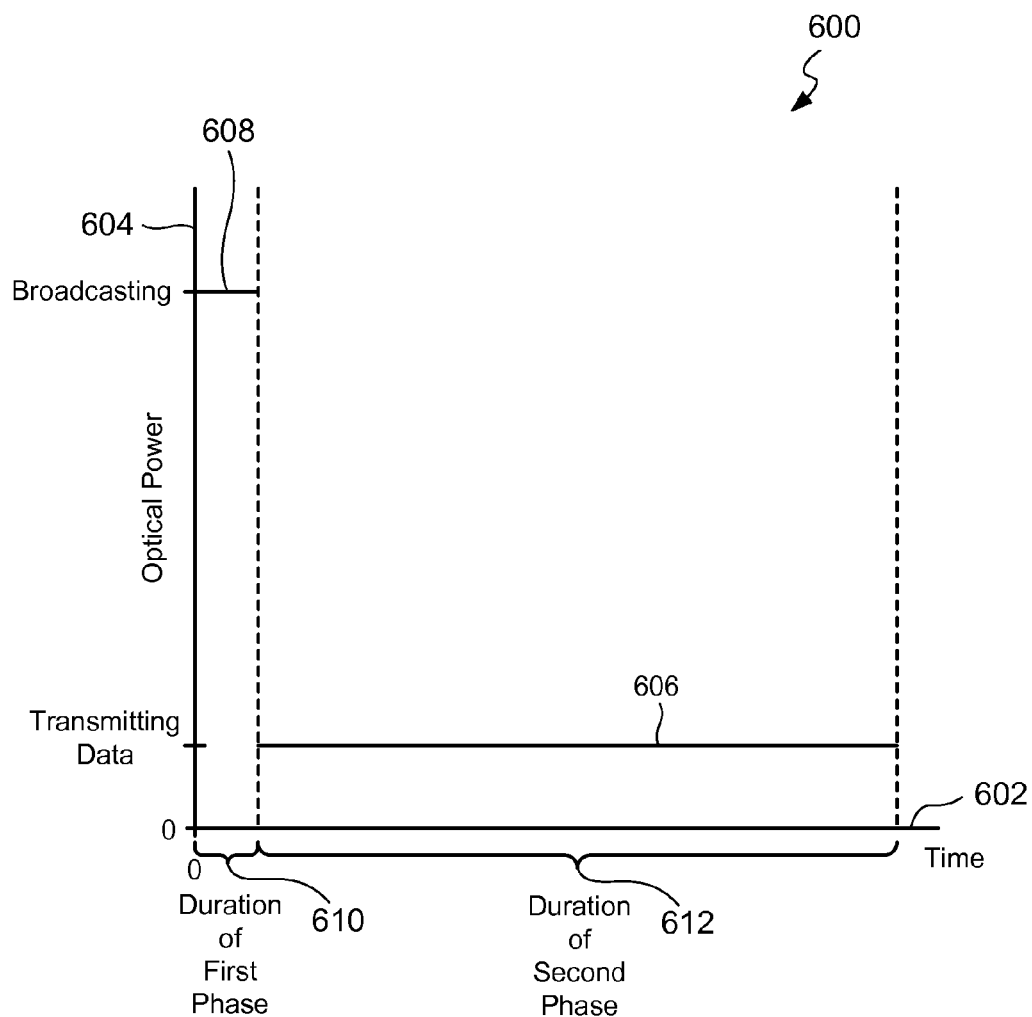
FIG. 6 shows an exemplary plot of optical power versus time for an optical enablement signal and an optical data signal in accordance with embodiments of the present invention.

FIG. 6 shows an exemplary plot 600 of optical power versus time for an optical enablement signal and an optical data signal in accordance with embodiments of the present invention. Horizontal line 602 represents a time axis, and vertical line 604 represents an optical power axis. The optical power of an optical data signal is represented by a line 606, and the optical power of an optical enablement signal is represented by a line 608. The plot 600 reveals that because the optical data signal only needs to reach one receiving device and the optical enablement signal $\lambda_{ENx}$ is broadcast to all of the receiving devices, the optical power 606 needed to transmit the optical data signal can be significantly less than the optical power 608 needed to broadcast the optical enablement signal $\lambda_{ENx}$ to all of the receiving devices. In addition, because the optical enablement signal $\lambda_{ENx}$ encodes only the address of the receiving device and substantially no other information, the duration 610 of the optical enablement signal may be considerable less than the duration 612 of the optical data signal.

Figure 7:
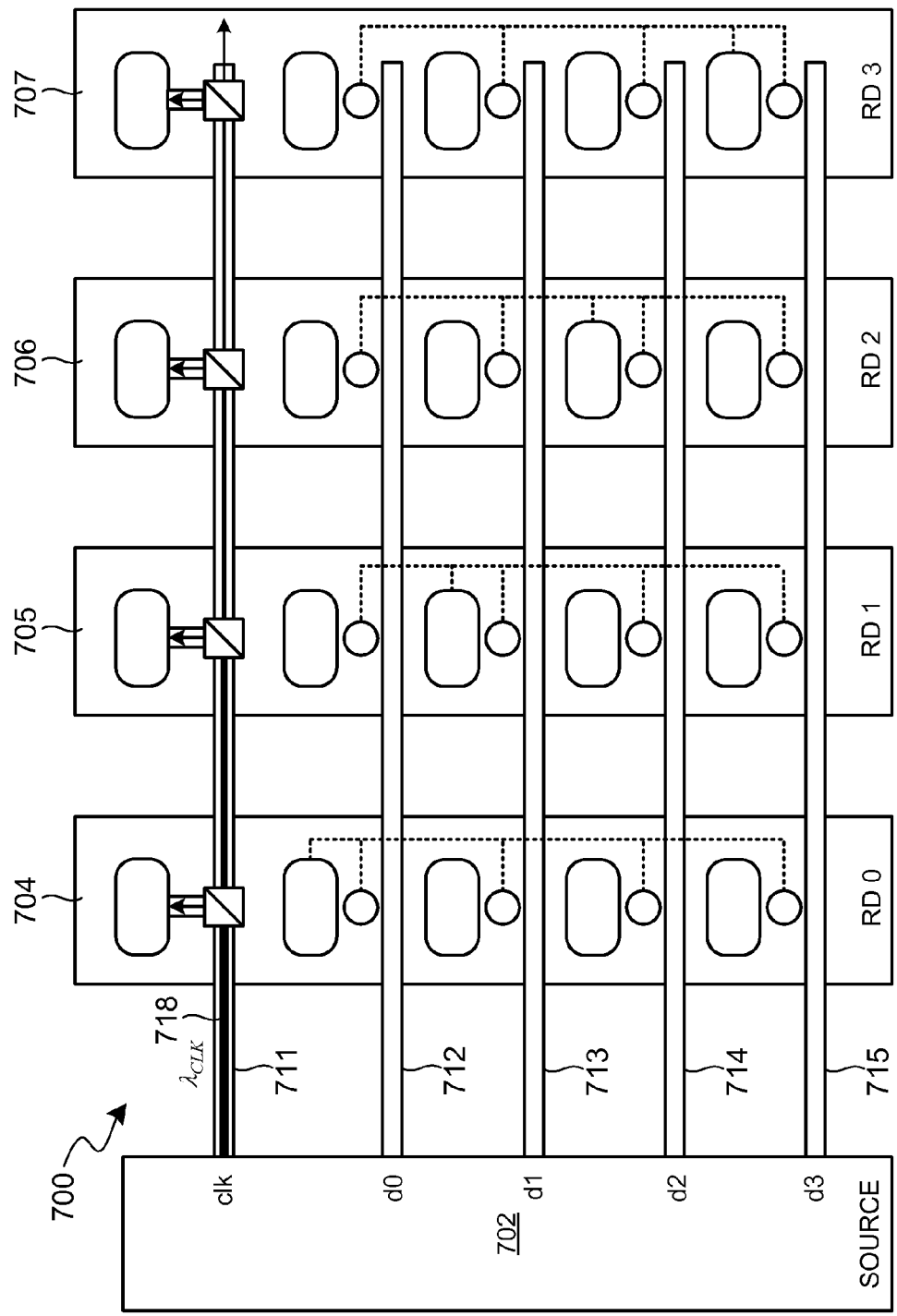
FIG. 7 shows a schematic representation of a third optical bus system configured in accordance with embodiments of the present invention.

FIG. 7 shows a schematic representation of a third optical bus system 700 configured to transmit optical signals from a source 702 to four receiving devices 704-707 in accordance with embodiments of the present invention. The optical bus system 700 is nearly identical to the optical bus system 200 except the enablement waveguide 212 and corresponding partially reflective minors and optoelectronic converters included in the optical bus system 200 are not included in the optical bus system 700. The optical bus system 700 includes five separate waveguides 711-715, each of which is optically coupled at one end to the source 702. The source 702 outputs an optical signal on each of the waveguides 711-715. The waveguides 711-715 can be optical fibers, ridge waveguides, or photonic crystal waveguides, which are described in greater detail below with reference to FIG. 11-15. The optical bus system 700 includes 20 optoelectronic converters that are positioned and configured so that each optoelectronic converter is in optical communication with one of the five waveguides 711-715 and in electronic communication with one of the four receiving devices 704-707. The optoelectronic converters can be photodetectors, such as p-n junction or p-i-n junction photodiodes, or any other suitable optical-signal-to-electrical-signal converter. The optical bus system 700 includes partially reflective minors that divert portions of an optical clock signal $\lambda_{CLK}$ 718 transmitted along the waveguide 711 into corresponding optoelectronic converters as described above with reference to FIG. 2. The optical bus system 700 also includes electronically controlled resonators that can be configured and operated to selectively couple optical signals from the waveguides 712-715 into corresponding optoelectronic converters, as described above with reference to FIG. 2.

Figure 8A:
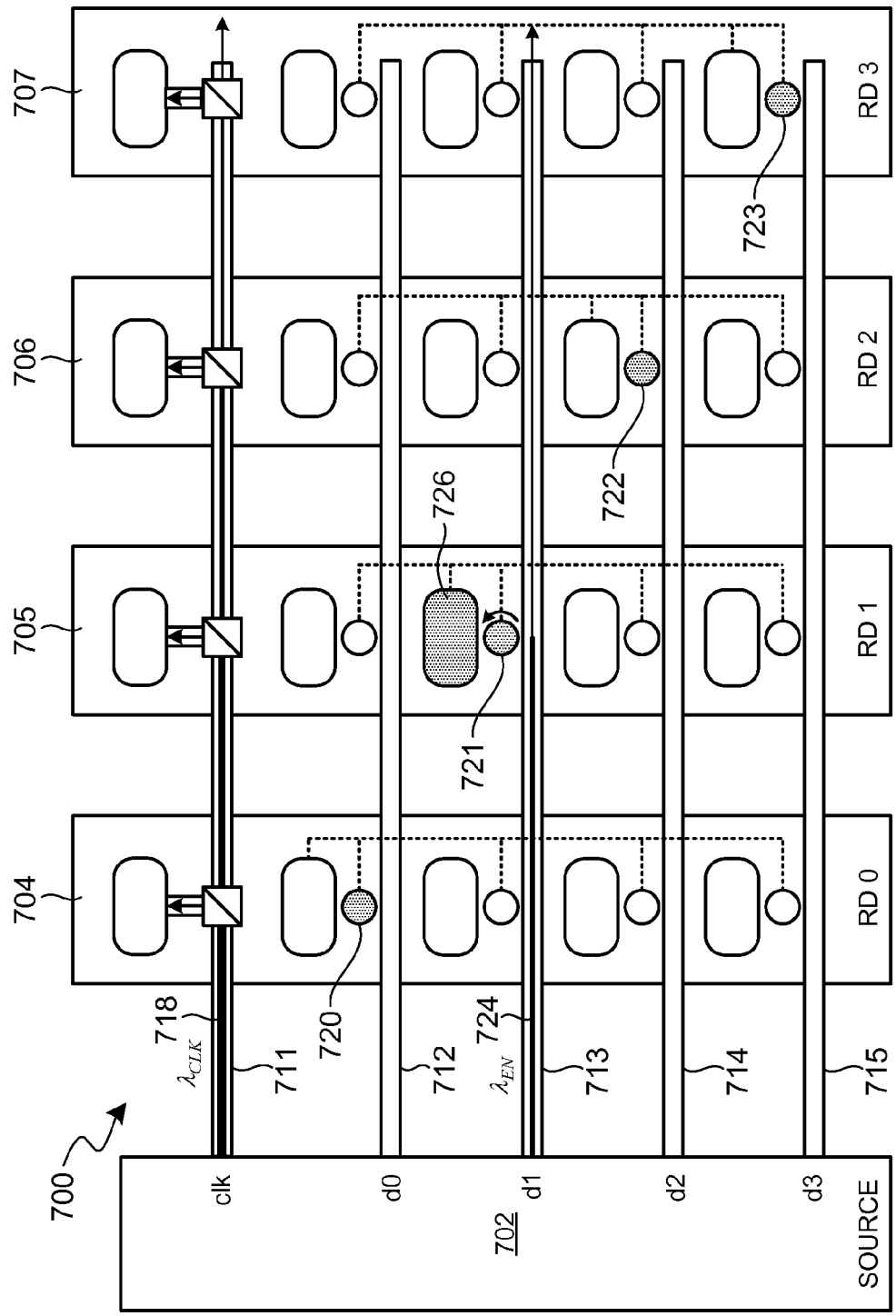
FIG. 8A shows an optical enablement signal transmitted on a waveguide of the third optical bus system shown in FIG. 7 in accordance with embodiments of the present invention.

A second method for completing a transaction between a source and a target receiving device in two phases is now described with reference to FIGS. 8-9 using the optical bus system 700. The source 702 selects, or can be directed to select by a different device not shown, which of the receiving devices 704-707 is to be used in the transaction.

In a first phase of the second method embodiment, each of the receiving devices 704-707 turns "on" one resonator that is optically coupled to a different waveguide and waits for an optical enablement signal $\lambda_{EN}$ to be output from the source 702. For example, in one embodiment shown in FIG. 8A, the receiving devices 704-707 turn "on" the resonators 720-723, respectively, and each receiving device waits for the source 702 to transmit an optical enablement signal $\lambda_{EN}$. In the present example, it is assumed that the receiving device 705 has initially been selected as the target receiving device for a transaction. The source 702 outputs the optical enablement signal $\lambda_{EN}$ 724 on the waveguide 713 which is evanescently coupled into the resonator 721 and into the optoelectronic converter 726. In this method embodiment, the optical enablement signal $\lambda_{EN}$ 724 is sent during a period of time when the receiving devices 704-707 are set to wait for the optical enablement signal $\lambda_{EN}$. In certain embodiments, the optical enablement signal $\lambda_{EN}$ may be encoded with the address of the target receiving device. In other embodiments, when the number of modules is less than the number of channels, the optical enablement signal $\lambda_{EN}$ can simply be a pulse or some other short duration optical signal, because the optical enablement signal $\lambda_{EN}$ is not broadcast to all of the receiving devices. For example, the optical enablement signal 724 is not broadcast to the receiving devices 704, 706, and 707 and, therefore, may be produced with only enough optical power to reach the receiving device 705.

Figure 8B:
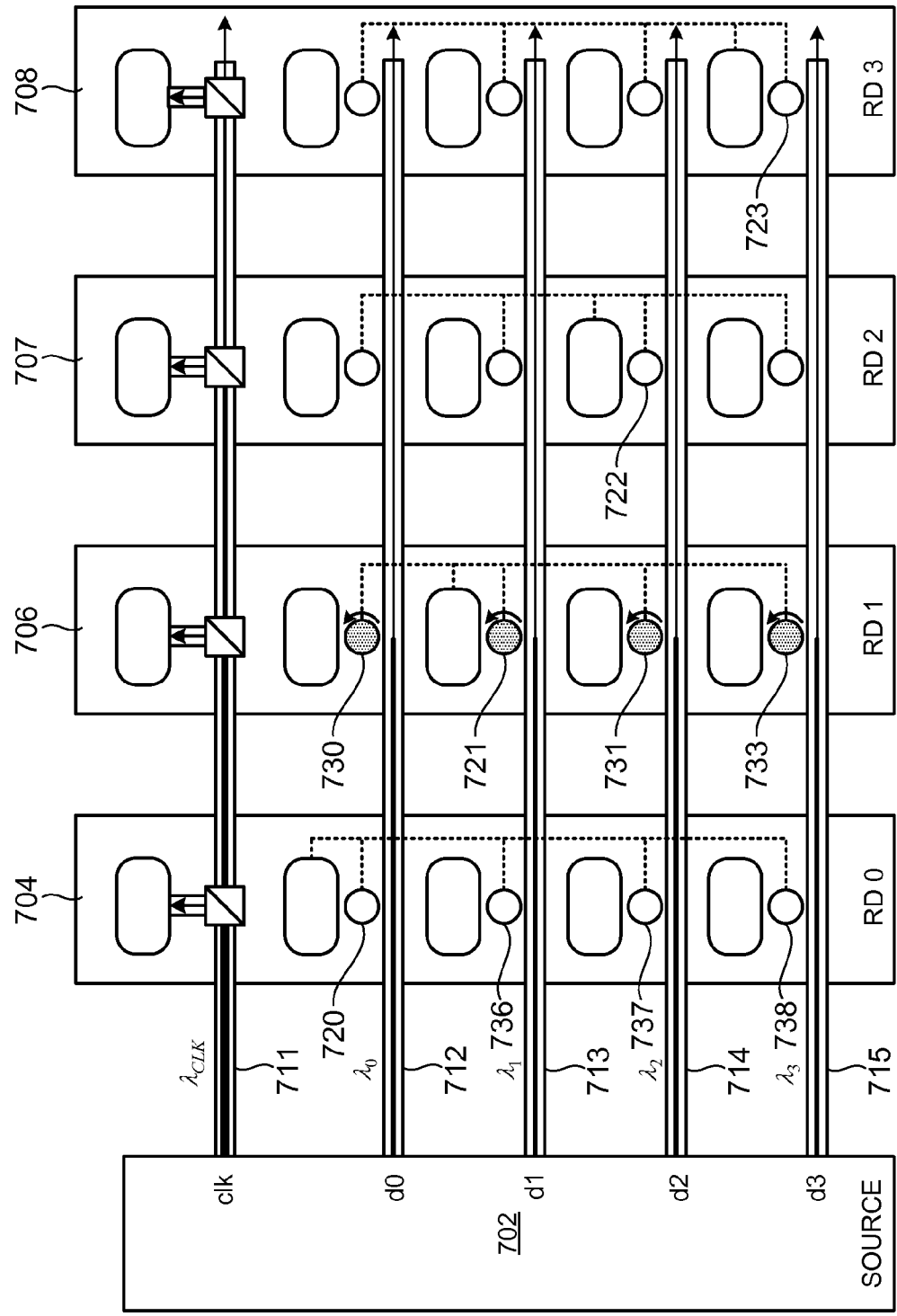
FIG. 8B shows optical data signals transmitted on four waveguides of the third optical bus system shown in FIG. 7 in accordance with embodiments of the present invention.

Referring now to FIG. 8B, in a second phase of the second method embodiment, when the period of time for sending the optical enablement signal $\lambda_{EN}$ is substantially completed, the non-selected receiving devices 704, 706, and 707 turn "off" their resonators 720, 722, and 723, respectively, and the selected receiving device 705 responds to the optical enablement signal $\lambda_{EN}$ 724 by turning "on" resonators 730-732. The source 702 transmits four optical data signals $\lambda_0$, $\lambda_1$, $\lambda_2$, and $\lambda_3$ separately on the waveguides 712-715, respectively. Because the resonators 721 and 730-732 are the only resonators turned "on," the optical data signals $\lambda_0$, $\lambda_1$, $\lambda_2$, and $\lambda_3$ pass the resonators 720 and 736-738 along the waveguides 712-715 undisturbed, and significant portions of the optical data signals $\lambda_0$, $\lambda_1$, $\lambda_2$, and $\lambda_3$ are evanescently coupled from the waveguides 712-715 to corresponding optoelectronic converters via the resonators 726 and 730-732.

Figure 9:
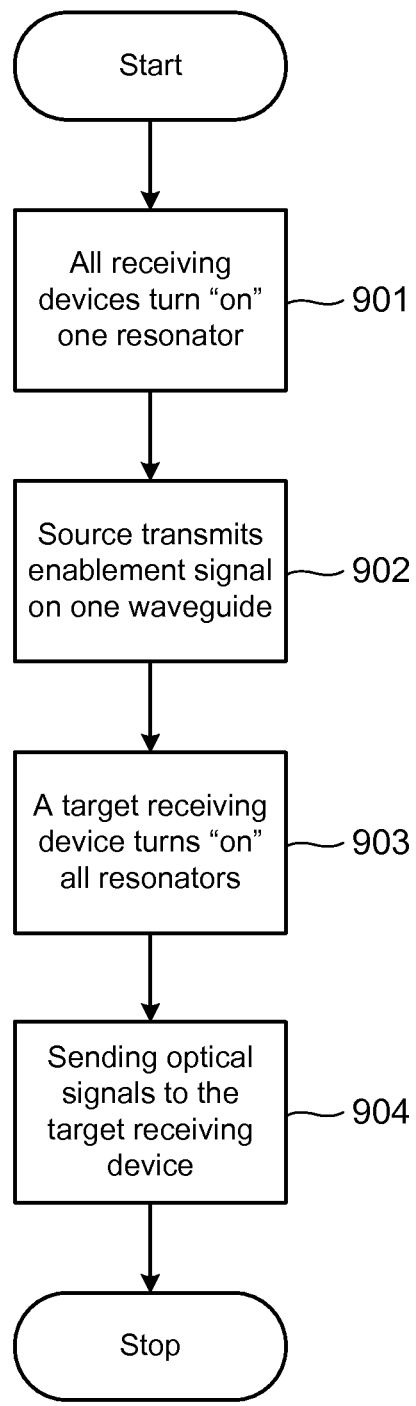
FIG. 9 is a control-flow diagram representing a number of steps of a second two-phase method in accordance with embodiments of the present invention.

FIG. 9 is a control-flow diagram representing a number of steps of the two-phase method described above with reference to FIG. 8 in accordance with embodiments of the present invention. In step 901, all receiving devices turn "on" one resonator that is optically coupled to a different waveguide and the receiving devices all wait for an optical enablement signal during a target time interval. In step 902, a source transmits an optical enablement signal to a target receiving device by transmitting the optical enablement signal on a waveguide coupled to the resonator that the target receiving device turned "on." In step 903, only the target receiving device responds by turning "on" resonators for receiving the data from the source while the remaining receiving devices respond by turning "off" their resonators. In step 904, the source transmits data in optical signals to the target receiving device over a number of waveguides with only enough optical power to be extracted by the target receiving device.

Figure 10:
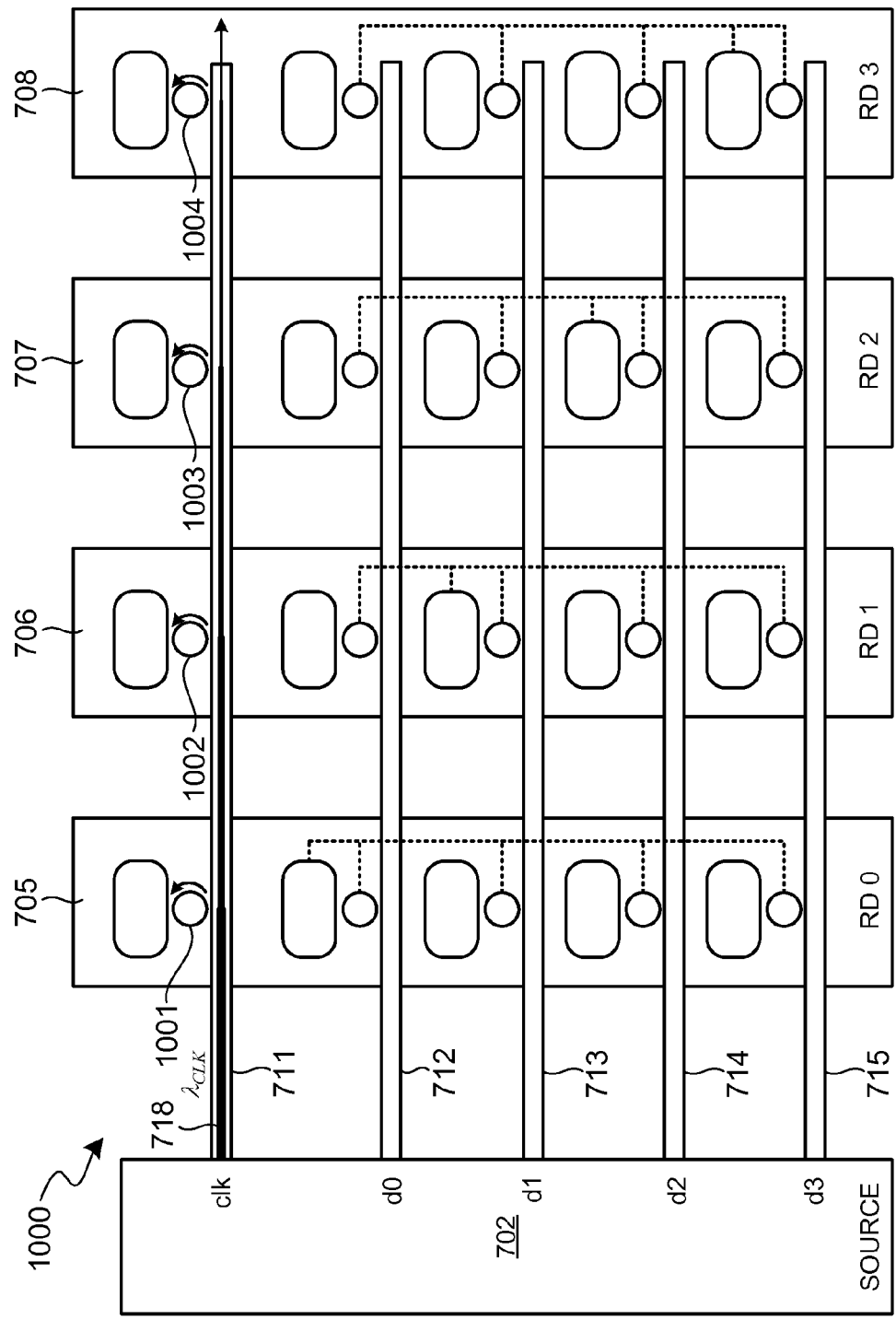
FIG. 10 shows a schematic representation of a fourth optical bus system configured in accordance with embodiments of the present invention.

In other embodiments of the present invention, the partially reflective mirrors that divert the optical clock signal $\lambda_{CLK}$ 718 from the waveguide 711 can be replaced with resonators. FIG. 10 shows a schematic representation of a second optical bus system 1000 configured to transmit optical signals from the source 702 to the four receiving devices 704-707 in accordance with embodiments of the present invention. The optical bus system 1000 is nearly identical to the optical bus system 700 except the partially reflective minors of the optical bus system 700 have been replaced by resonators 1001-1004 configured to have resonance with the channel of the optical clock signal $\lambda_{CLK}$ 718. Thus, the resonators 1001-1004 evanescently couple the optical clock signal $\lambda_{CLK}$ 718 from the waveguide 711 and into associated optoelectronic converters. Unlike the electronically operable resonators used to evanescently couple with optical data signals transmitted in the waveguides 712-715, the resonators 1001-1004 do not have to be electronically operable.

In certain variations of the first and second method embodiments described above, the four optical data signals $\lambda_0, \lambda_1, \lambda_2$, and $\lambda_3$ can be produced by modulating four unmodulated optical signals. The optical data signals can be of the same channel or any combination of different channels. Only the resonators that are optically coupled to one waveguide are configured to have resonance with the channel of the optical data signal transmitted along that waveguide when turned "on" and are off resonance with the same optical data signal when the resonators are turned "off."

Figure 11:
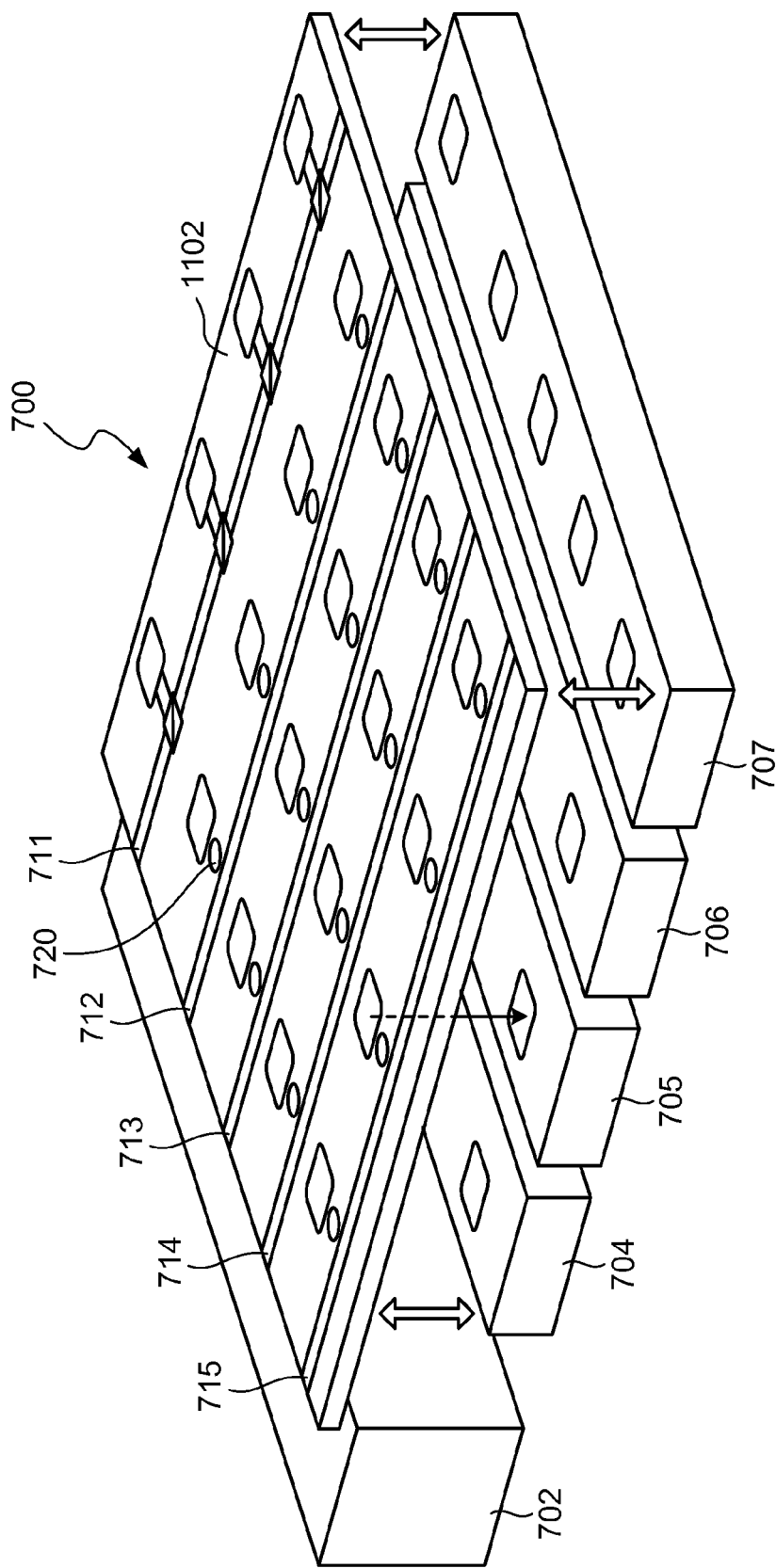
FIG. 11 shows an exploded isometric view and exemplary representation of the optical bus system shown in FIG. 7 configured in accordance with embodiments of the present invention.

The optical bus systems 200, 500, 700, and 1000 described above may be implemented in any slab of suitable material. FIG. 11 shows an exploded isometric view and exemplary representation of the optical bus system 700 shown in FIG. 7 configured in accordance with embodiments of the present invention. The optical bus system 700 is formed in a single slab 1102. The slab 1102 can be composed of a semiconductor such as Si and Ge or a compound semiconductor formed from a combination of group IIIA elements of the periodic table, such as Al, Ga, and In, and group VA elements of the periodic table, such as N, P, As, and Sb. GaAs, AsGaAs, InGaAs, and InGaAsP are examples of compound semiconductors. The slab 1102 can also be composed of a suitable dielectric material such as silica ($SiO_2$) and silicon nitride ($Si_3N_4$).

Figure 12:
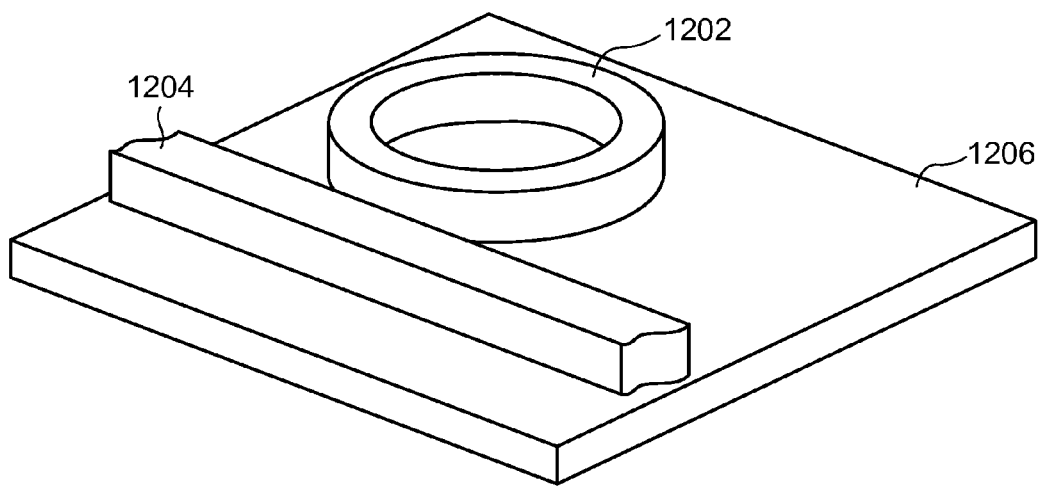
FIG. 12 shows an isometric view of a microring resonator and a portion of an adjacent ridge waveguide configured in accordance with embodiments of the present invention.

In certain system embodiments, the waveguides 211-216 shown in FIG. 2 and the waveguides 711-715 shown in FIG. 7 can be ridge waveguides, and the resonators, such as resonator 221, can be microring resonators. FIG. 12 shows an isometric view of a microring resonator 1202 and a portion of an adjacent ridge waveguide 1204 disposed on a substrate 1206 and configured in accordance with embodiments of the present invention. The transmission of an optical signal along the waveguide 1204 may be greatly reduced when the channel of the optical signal is resonant with the microring 1202. The optical signal is evanescently couple from the waveguide 1204 into the microring 1202.

Figure 13:
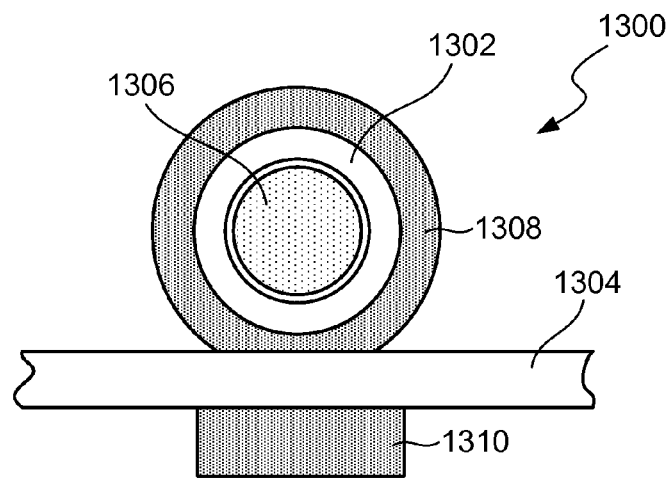
FIG. 13 shows a top view and schematic representation of a microring resonator configured as a p-i-n junction in accordance with embodiments of the present invention.

Regions surrounding the microring resonator 1202 can doped with electron donor atoms and electron acceptor atoms and electronically controlled by a corresponding receiving device as described above with reference to FIGS. 3-4 and 8-9. FIG. 13 shows a top view and schematic representation of an electronically controlled microring resonator 1302 and ridge waveguide 1304 configured in accordance with embodiments of the present invention. The microring 1302 is positioned in close proximity to the waveguide 1304. In certain embodiments, the microring 1302 comprises an intrinsic semiconductor. A p-type semiconductor region 1306 can be formed in the semiconductor substrate interior of the microring 1302, and n-type semiconductor regions 1308 and 1310 can be formed in the semiconductor substrate surrounding the outside of the microring 1302 and on the opposite side of the waveguide 1304. The p-type region 1306 and the n-type regions 1308 and 1310 form a p-i-n junction around the microring 1302. In other embodiments, the dopants can be reversed by forming an n-type semiconductor region 1306 in the semiconductor substrate interior of the microring 1302, and p-type semiconductor regions 1308 and 1310 in the semiconductor substrate surrounding the outside of the microring 1302.

The resonance of the microring 1302 can be electronically controlled by applying an appropriate voltage or current to the regions 1306 and the regions 1308 and 1320. The microring 1302 can be configured so that the resonance of the microring 1302 is not in resonance with the channel of an optical signal propagating along the waveguide 1304. On the other hand, the microring 1302 can also be configured so that when an appropriate voltage is applied to the microring 1302, the same optical signal is resonant with the microring 1302 and evanescently couples from the waveguide 1304 into the microring 1302. When the voltage is subsequently turned "off," the resonance of the microring 1302 shifts back and the same optical signal propagates along the waveguide 1304 undisturbed. For an example of microring modulators see Q. Xu, et al., "12.5 Gbit/s carrier-injection-based silicon microring silicon modulators," *Optics Express* 15, 430 (2007)

In other system embodiments, the waveguides 211-216 shown in FIG. 2 and the waveguides 711-715 shown in FIG. 7 can be photonic crystal waveguides, and the resonators, such as resonator 221, can be resonant cavities. Photonic crystals are photonic devices comprised of two or more different materials with dielectric properties that, when combined together in a regular pattern, can modify the propagation characteristics of electromagnetic radiation ("EMR"). Two-dimensional photonic crystals can be comprised of a regular lattice of cylindrical holes fabricated in a dielectric or semiconductor slab. The cylindrical holes can be air holes or holes filled with a dielectric material different from the dielectric material of the photonic slab. Two-dimensional photonic crystals can be designed to reflect EMR within a specified frequency band. As a result, a two-dimensional photonic crystal can be designed and fabricated as a frequency-band stop filter to prevent the propagation of EMR having frequencies within the photonic bandgap of the photonic crystal. Generally, the size and relative spacing of cylindrical holes control which wavelengths of EMR are prohibited from propagating in the two-dimensional photonic crystal. However, defects can be introduced into the lattice of cylindrical holes to produce particular localized components. In particular, a resonant cavity, also referred to as a "point defect," can be fabricated to provide a resonator that temporarily traps a narrow range of wavelengths of EMR. A waveguide, also referred to as a "line defect," can be fabricated to transmit EMR with wavelengths that lie within a wavelength range of a photonic bandgap.

Figure 14:
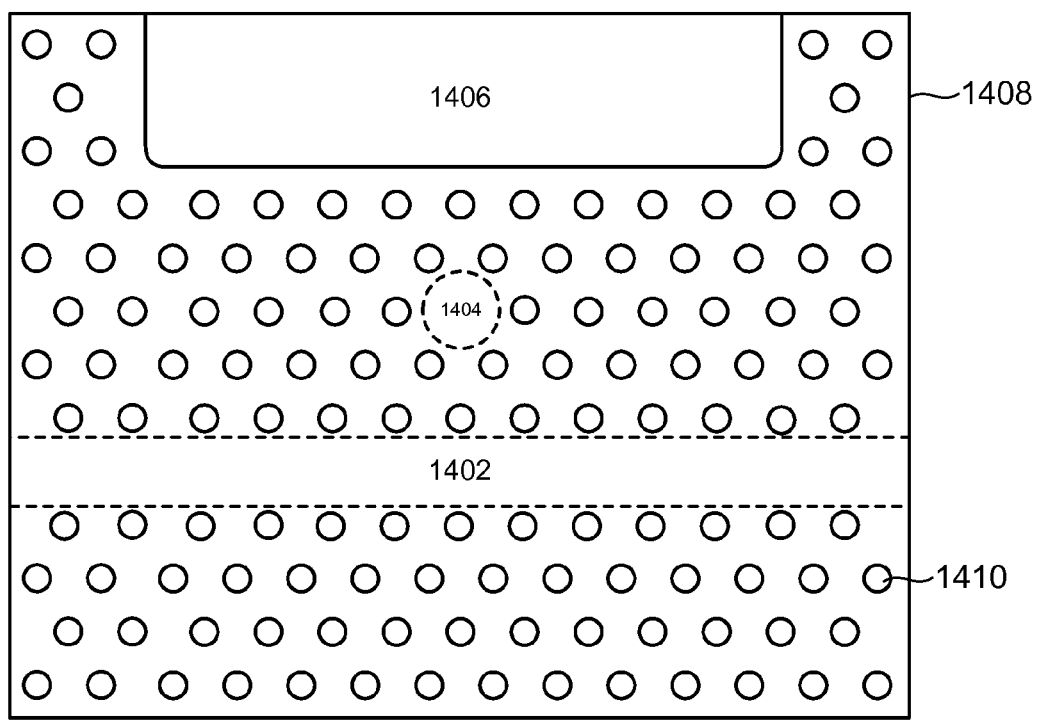
FIG. 14 shows a top view of a photonic crystal waveguide, a resonant cavity, and a portion of an optoelectronic device configured in accordance with embodiments of the present invention.

FIG. 14 shows a top view of a photonic crystal waveguide 1402, a resonant cavity 1404 and a portion of an optoelectronic device 1406 formed in a slab 1408 in accordance with embodiments of the present invention. Circles, such as circle 1410, represent holes that span the height of the slab 1408. A resonant cavity can be created by omitting, increasing, or decreasing the size of a select cylindrical hole. In particular, the resonant cavity 1404 is created by omitting a cylindrical hole, as indicated by the empty region surrounded by a dashed circle. The holes surrounding the resonant cavity 1404 and the waveguide 1402 form a two-dimensional Bragg grating that temporarily traps EMR in the frequency range of the photonic crystal bandgap within the waveguide 1402 and the resonant cavity 1404. Photonic crystal waveguides are optical transmission paths that can be used to direct optical signals within a particular wavelength range of the photonic crystal bandgap. Waveguides can be fabricated by changing the diameter of certain cylindrical holes within a column or row of cylindrical holes, or by omitting rows of cylindrical holes. For example, the waveguide 1402 is created by omitting an entire row of cylindrical holes. Networks of branching waveguides can be used to direct EMR in numerous different pathways through the photonic crystal. The diameter of an electromagnetic signal propagating along a waveguide can be as small as $\lambda/3n$, where n is the refractive index of the slab, while a harmonic mode volume of a resonant cavity can be as small as $2\lambda/3n$.

Waveguides and resonant cavities may be less than 100% effective in preventing EMR from escaping into the area immediately surrounding the waveguides and resonant cavities. For example, EMR within a frequency range in the photonic bandgap propagating along a waveguide also tends to diffuse into the region surrounding the waveguide. EMR entering the area surrounding the waveguide 1402 or the resonant cavity 1404 experiences an exponential decay in amplitude in a process called "evanescence." As a result, the resonant cavity 1404 is located within a short distance of the waveguide 1402 to allow certain wavelengths of EMR carried by the waveguide 1402 to evanescently couple from the waveguide 1402 into the resonant cavity 1404. Depending on a resonant cavity 1404 Q factor, an extracted EMR can remain trapped in the resonant cavity 1404 and resonate before evanescently coupling into the optoelectronic device 1406.

Figure 15A:
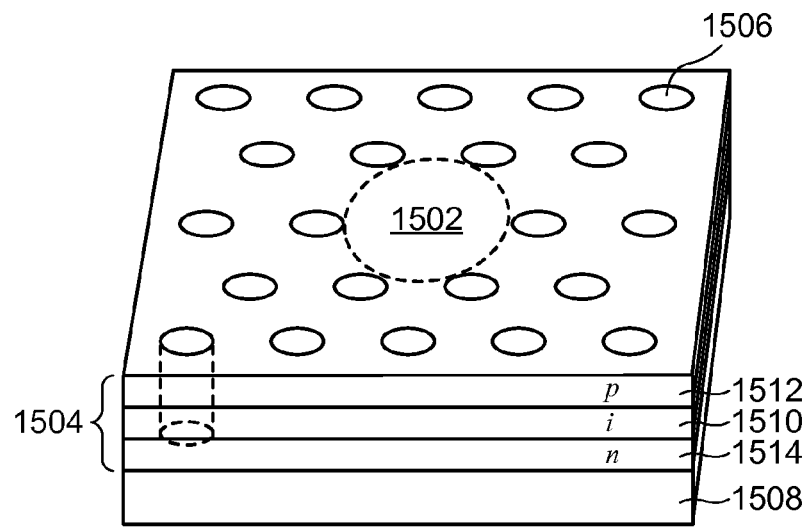
FIG. 15A shows a resonant cavity configured in accordance with embodiments of the present invention.

FIG. 15A shows a resonant cavity 1502 and portion of slab 1504 configured in accordance with embodiments of the present invention. The resonant cavity 1502 is created by omitting a cylindrical hole. The diameter of the resonant cavity 1502 and the pattern and diameter of cylindrical holes surrounding the resonant cavity 1502, such as cylindrical hole 1506, can be selected to temporarily trap a specific channel of an optical signal within the resonant cavity 1502. The slab 1504 is located on top of a glass substrate 1508. As shown in FIG. 15A, the slab 1504 may be comprised an intrinsic layer 1510 sandwiched between a positively doped semiconductor layer 1512 and a negatively doped semiconductor layer 1514.

Figure 15B:
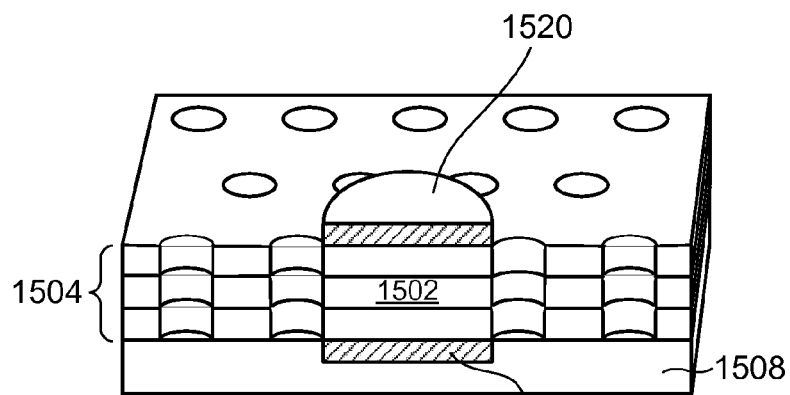
FIG. 15B shows a cross-sectional view of a first electronically operated resonant cavity configured in accordance with embodiments of the present invention.

FIG. 15B shows a cross-sectional view of a first electronically controllable resonant cavity configured in accordance with embodiments of the present invention. The resonant cavity 1502 is sandwiched between two electrodes 1520 and 1522. The slab 1504 can be comprised of the p-i-n layers 1510, 1512, and 1512 or a single layer, such as a single dielectric or semiconductor layer. By applying a voltage across the resonant cavity 1502 the resonance of the resonant cavity can be shifted into resonance with a channel of an optical signal.

Figure 15C:
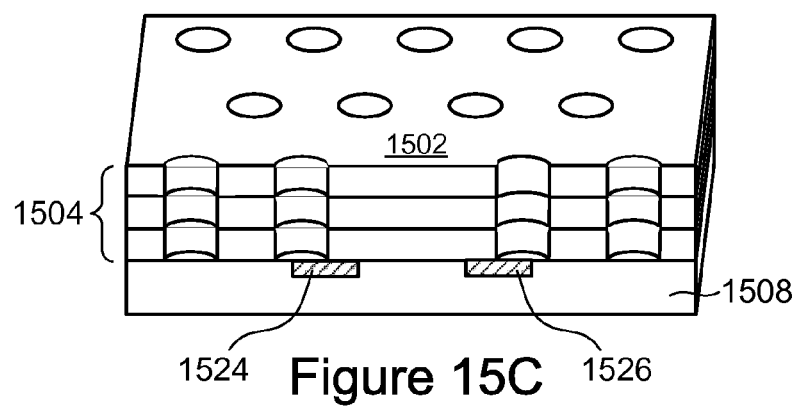
FIG. 15C shows a cross-sectional view of a second electronically operated resonant cavity configured in accordance with embodiments of the present invention.

FIG. 15C shows a cross-sectional view of a second electronically controllable resonant cavity configured in accordance with embodiments of the present invention. The resonant cavity 1502 is sandwiched between two electrodes 1524 and 1526. The slab 1504 can also be comprised of the p-i-n layers 1510, 1512, and 1512 or a single layer, such as a single dielectric or semiconductor layer. By applying a voltage across the resonant cavity 1502 the resonance of the resonant cavity can also be shifted into resonance with a channel of an optical signal.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A method for transmitting one or more optical data signals from a source to a target receiving device of a plurality of receiving devices, the method comprising:

transmitting an optical enablement signal to the plurality of receiving devices, wherein the target receiving device is configured to respond to receiving the optical enablement signal by preparing to receive the one or more optical data signals; and transmitting the one or more optical data signals from the source to the target receiving device and the remaining receiving devices do not receive the one or more optical data signals.

2. The method of claim 1 further comprising:

terminating the optical enablement signal before transmitting the one or more optical data signals to the target receiving device; and transmitting a second optical enablement signal to a second target receiving device while transmitting the one or more optical data signals from the source to the target receiving device.

3. The method of claim 1 further comprising:

transmitting the optical enablement signal in a first waveguide;

transmitting the one or more optical data signals in one or more separate waveguides that are different from the first waveguide; and transmitting the optical enablement signal over a first time period and transmitting the one or more optical data signals over a second time period using the same one or more waveguides.

4. The method of claim 1 wherein the optical power of each of the one or more optical data signals is less than the optical power of the optical enablement signal.

5. The method of claim 1 wherein transmitting the one or more optical data signals from the source to the target receiving device further comprises configuring resonators associated with the target receiving device to receive the one or more optical data signals.

6. The method of claim 1 further comprising terminating the optical enablement signal before transmitting the one or more optical data signals to the target receiving device.

7. The method of claim 1 further comprising transmitting a second optical enablement signal to a second target receiving device while transmitting the one or more optical data signals from the source to the target receiving device.

8. The method of claim 1 further comprising:

transmitting the optical enablement signal in a first waveguide; and transmitting the one or more optical data signals in one or more separate waveguides that are different from the first waveguide.

9. The method of claim 1 further comprising transmitting the optical enablement signal over a first time period and transmitting the one or more optical data signals over a second time period using the same one or more waveguides.

10. The method of claim 1 wherein a duration associated with transmitting the one or more optical data signals is less than a duration associated with transmitting the optical enablement signal.

11. The method of claim 1 wherein transmitting the optical enablement signal to the plurality of receiving devices further comprises encoding an address of the target receiving device in an unmodulated optical signal.

12. The method of claim 1 wherein transmitting the optical enablement signal to the plurality of receiving devices further comprises transmitting an optical pulse to the target receiving device only.

13. The method of claim 1 wherein transmitting the optical enablement signal to the plurality of receiving devices causes each of the plurality receiving devices to apply a predefined voltage to an associated electronically controlled resonator to wait to receive the optical enablement signal.

14. The method of claim 1 wherein the remaining receiving devices not receiving the one or more optical data signals comprises the remaining receiving devices discontinuing applying a predefined voltage to associated electronically controlled resonators.

* * * * *

UNITED STATES PATENT AND TRADEMARK OFFICE
CERTIFICATE OF CORRECTION

PATENT NO. : 8,472,802 B2
APPLICATION NO. : 12/921763
DATED : June 25, 2013
INVENTOR(S) : Jung Ho Ahn et al.

It is certified that error appears in the above-identified patent and that said Letters Patent is hereby corrected as shown below:

In the Claims:

In column 12, line 67, in Claim 13, delete "plurality" and insert -- plurality of --, therefor.

Signed and Sealed this
Nineteenth Day of November, 2013

Teresa Stanek Rea
*Deputy Director of the United States Patent and Trademark Office*